Jan. 7, 1947.  L. B. NEIGHBOUR  2,413,775
TRACTOR ACCESSORY AND MOUNTING THEREFOR
Filed April 26, 1940
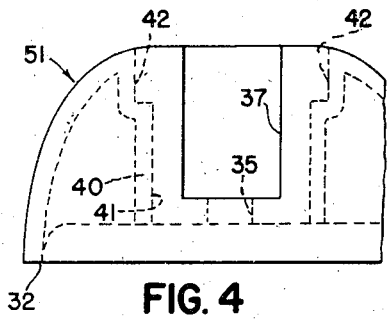
FIG. 4
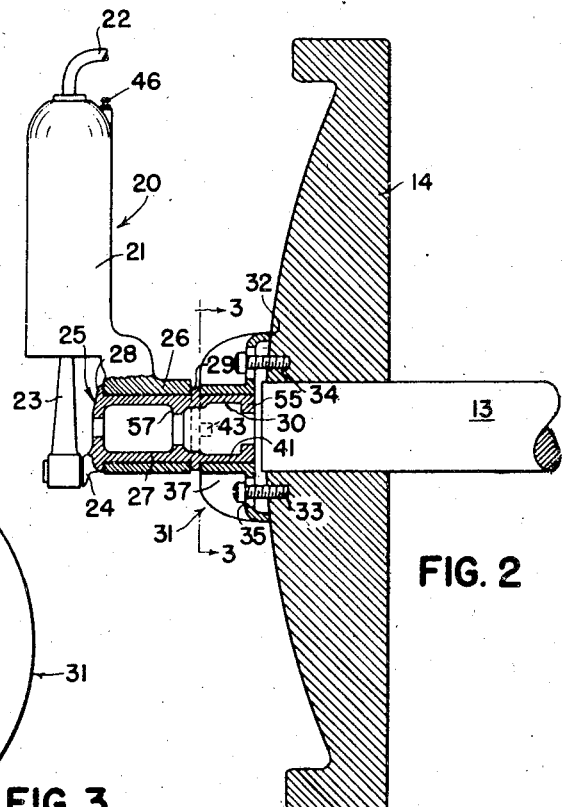
FIG. 2
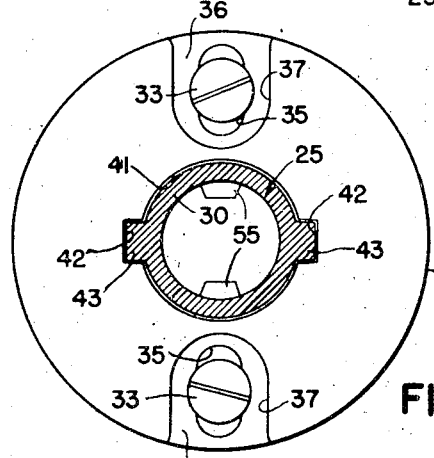
FIG. 3
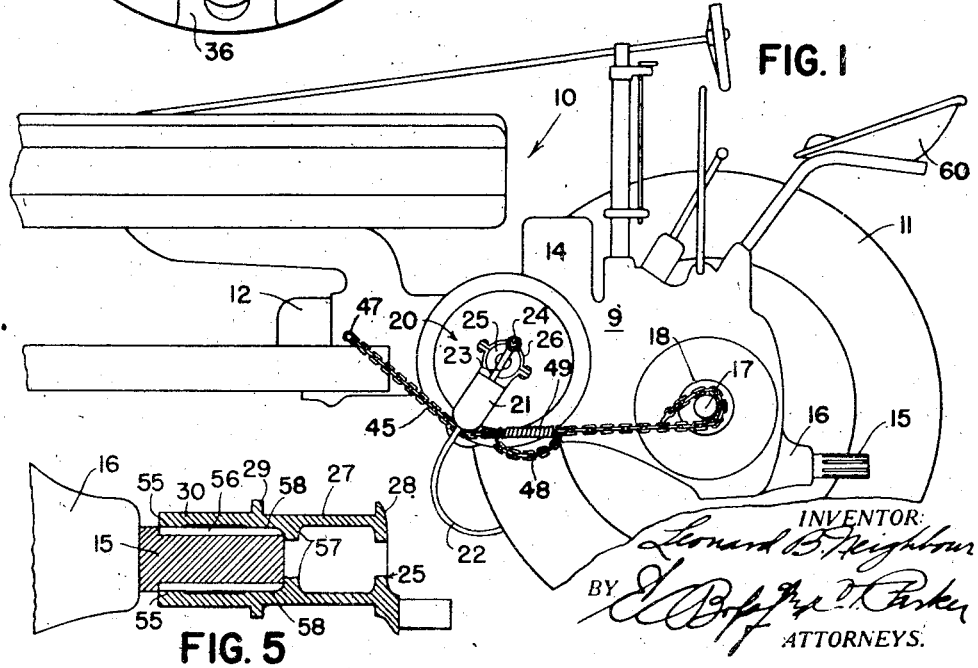
FIG. 1
FIG. 5
INVENTOR:
Leonard B. Neighbour
BY
ATTORNEYS.

Patented Jan. 7, 1947

2,413,775

UNITED STATES PATENT OFFICE 2,413,775

TRACTOR ACCESSORY AND MOUNTING THEREFOR

Leonard B. Neighbour, Moline, Ill., assignor to Deere & Company, Moline, Ill., a corporation of Illinois Application April 26, 1940, Serial No. 331,826

11 Claims. (Cl. 230—39)

The present invention relates generally to accessories for tractors and the like, and more particularly to novel and improved means for mounting such an accessory on a rotary element of the tractor. A co-pending application, Serial No. 239,262, filed jointly by T. W. Paul and the present applicant on November 7, 1938, and issued December 9, 1941 as Patent No. 2,265,971, discloses an accessory of this general nature comprising a tire pump adapted for use with tractors and the like. The pump disclosed in the above-mentioned co-pending application is supported on a hub which is journaled on a driving sleeve which is adapted to fit over the splined end of the power take-off shaft of the tractor. It frequently happens, however, that the operator will have occasion to use the pump or other accessory at a time when the power take-off shaft is connected to an implement associated with the tractor and thereby requiring a considerable amount of work in disconnecting the implement in order to permit the accessory to be connected to the power take-off shaft, and later to reconnect the implement thereto. Nearly every tractor of modern design, however, has either an external flywheel or a belt pulley, or both, and it is therefore the principal object of my invention to provide a novel and simple means for mounting an air pump or other tractor accessory upon the flywheel, pulley, or other rotary element of the tractor.

A more specific object of my invention relates to the provision of a novel supporting and driving member which is adapted to be supported either on the tractor power take-off shaft or on an adapter fixed to the flywheel or other rotary element of the tractor. A further object relates to the provision of a novel adapter which can be fixed to the flywheel for supporting an accessory such as an air pump or the like and which is smooth and free from projecting corners or supporting bolts which would tend to catch in the clothing of the operator, and which is thus safe to leave permanently attached to the rotary power element, after the accessory has been detached therefrom.

These and other objects and advantages will become apparent after a consideration of the following description, taken in conjunction with the drawing appended hereto, in which Figure 1 is a partial side elevation of a tractor showing an air pump mounted on the flywheel thereof;

Figure 2 is an enlarged view taken in section through the axis of the flywheel and mounting means;

Figure 3 is a sectional front view drawn to an enlarged scale, showing the adapter as viewed along a line 3—3 in Figure 2;

Figure 4 is a side view of the adapter; and

Figure 5 is a sectional view showing the mounting sleeve in position on the power take-off shaft of the tractor.

Referring now to the drawing, the tractor 10 comprises a longitudinally extending body 9 supported on dirigible front wheels (not shown) and on rear traction wheels 11, the near wheel being removed to more clearly show the details of my invention. The tractor is provided with an engine 12 which has a drive shaft 13 extending laterally out of the tractor body and on which is mounted a flywheel 14. The tractor is also provided with a more or less conventional power take-off shaft driven by the tractor engine 12 and having a splined end 15 which projects rearwardly from a supporting bearing 16. The tractor wheels 11 are mounted on laterally extending axles 17 supported in the usual laterally extending axle housings 18 on opposite sides of the tractor body 9.

The air pump 20 comprises a cylinder 21 within which is disposed a piston (not shown) cooperative therewith to force air through a suitable air hose 22. The piston is connected through a connecting rod 23 to a crank pin 24 which is formed integrally, as by casting, on the end of a drive member 25. The drive member 25 comprises a sleeve which is rotatably journaled in a split hub 26, the latter being rigidly fixed to the cylinder 21 for supporting the latter. As indicated in Figure 3, the cylinder and one half of the split hub 26 are formed integrally with the hub portion offset from the lower end of the cylinder, leaving the lower end of the cylinder unobstructed to permit installation and removal of the piston and its connecting rod 23. The journal portion 27 of the sleeve has at each end thereof a thrust flange 28, 29 for retaining the bearing hub 26 thereon, while the driving sleeve 25 has an extension 30 beyond the hub 26 providing a supporting portion, which is supported on the axis of the flywheel 14 for rotation therewith by means of a supporting member or adapter 31.

The adapter 31 comprises a hollow cup-shaped member having a rim 32 adapted to fit against the outer surface of the flywheel 14 concentric with the drive shaft 13. The adapter is mounted on the flywheel 14 by means of a pair of cap screws 33 which are threaded into suitable tapped sockets 34 in the flywheel and extend outwardly through radially extending slots 35 in a pair of oppositely disposed vertical wall portions 36 formed in depressed portions 37 of the adapter 31. The purpose of the slots 35 is to permit the adapter to be adjusted to a position coaxial with the axis of the drive shaft 13 before the screws 33 are tightened. By virtue of the depressions 37 the heads of the cap screws 33 are countersunk below the outer surface of the cup-shaped adapter 31 and are thus protected to prevent their catching in the clothing of the operator while he is standing nearby while the flywheel is rotating.

The adapter is provided with a centrally disposed sleeve portion 40, the interior of which provides a socket 41 for receiving the supporting portion 30 of the drive sleeve 25. The outer end of the socket 41 is provided with a pair of oppositely disposed recesses 42, adapted to receive a pair of splines 43 formed on the outside of the supporting portion 30 of the driving sleeve 25. The interlocking relation between the splines 43 and the recesses 42 provides a positive drive between the adapter 31 and the driving sleeve 25.

The adapter 31 can be left permanently attached to the flywheel 14 without danger to the operator for there are no projections or sharp corners which would cause any injury or catch in his clothing. The pump is easily attached to the adapter by merely inserting the supporting portion 30 of the sleeve 25 into the socket 41 and sliding the keys 43 into the recesses 42, in which position the pump is firmly supported by virtue of its journal bearing 26 on the bearing portion 27 of the sleeve 25. The pump is prevented from rotating with the drive sleeve 25 by means of a chain 45, the intermediate portion of which is secured to a screw 46 on the cylinder housing 21. One end of the chain is fixed to a suitable bolt 47 or other projection on the tractor forward of the flywheel, and the opposite end of the chain is fastened around the tractor axle 17, as best shown in Figure 1. Any slack in the chain, as indicated by 48, is taken up by means of a spring 49, causing the chain to stretch tightly between the axle 17 and the bolt 47 and thereby holding the pump against rotation and also preventing it from sliding axially out of the socket 41.

Referring now more particularly to Figure 5, the interior of the driving sleeve 25 is provided with inwardly extending teeth 55 which are adapted to interlock with the splines 56 on the splined end of the power take-off shaft 15. Spaced inwardly from the teeth 55 is an annular boss 58 which receives the end of the power take-off shaft 15 and forms a support for the pump. An inwardly directed flange 57 within the sleeve 25 provides a stop against which the end of the power take-off shaft 15 abuts during operation of the pump. When the pump is operated on the power take-off shaft, it is prevented from rotating therewith by means of the chain 45 which can be connected between the two tractor wheels or between the tractor seat 60 and the drawbar, as disclosed in the above-mentioned co-pending application.

Thus, the mounting means disclosed herein can be used with an air pump or other accessory for mounting and driving the latter interchangeably either on the power take-off shaft of the tractor or on any other suitable rotary parts such as a flywheel or a belt pulley or the like.

I do not intend my invention to be limited to the exact details shown and described herein except as set forth in the claims which follow.

I claim:

1. A device of the class described, comprising a casing having operating mechanism enclosed therewithin, a tubular supporting sleeve fixed thereto, a drive sleeve having one end journaled in said supporting sleeve and having an internal recess adapted to receive a power shaft and provided with teeth for engaging splines on said shaft, an adapter having a socket for receiving and serving as the sole support for the other end of said driving sleeve and having means for preventing relative rotation therebetween, means for rigidly mounting said adapter on a rotary power element, and power transmitting means attached to said drive sleeve and connected with said operating mechanism for driving the latter when said drive sleeve is rotated relative to said supporting sleeve.

2. A portable accessory for a tractor, comprising in combination, a casing having a supporting hub, a drive sleeve adapted to receive a power shaft therewithin and having internal teeth for engaging splines thereon, an external projection for engaging cooperative parts of an adapter for supporting said sleeve on a rotatable member and driving the sleeve thereby, and a bearing portion for rotatably supporting said hub, and power transmitting means attached to said drive sleeve and adapted to drive mechanism associated with said device.

3. For use in a device of the class described, a drive sleeve adapted to receive a power shaft therewithin and having internal teeth for engaging splines thereon, an external projection associated with one end for engaging cooperative parts of an adapter for supporting said sleeve on a rotatable member and driving the sleeve thereby, a bearing portion adjacent the opposite end for rotatably supporting a hub of said device, and a crank pin attached rigidly to the latter end of said drive sleeve for driving mechanism associated with said device.

4. A portable pump for use as an accessory on a tractor or the like, comprising in combination, a cylinder, a hub attached thereto and disposed on an axis perpendicular to the major axis of said cylinder, a drive sleeve journaled in said hub, a crank pin fixed to said sleeve, a piston rod journaled on said pin and extending into said cylinder to operate suitable piston means therein, said sleeve having an internally splined extension on the opposite side of said hub, an adapter having a socket into which said extension is adapted to be inserted to provide a sole support therefor, means for preventing relative rotation therebetween, and means for securing said adapter rigidly on the axis of rotation of a flywheel.

5. A portable pump for a tractor, comprising in combination, a cylinder having a supporting hub attached thereto, a drive sleeve adapted to receive a power shaft therewithin and having internal teeth for engaging splines thereon, an external projection at one end for engaging cooperative parts of an adapter, a bearing portion adjacent the opposite end for rotatably supporting said hub, a crank pin attached rigidly to the latter end of said drive sleeve, a piston in said cylinder, and a connecting rod connecting said piston with said crank.

6. An air compressor of the character described comprising, in combination, an L-shaped casting, one arm of the L-shaped casting forming the end and side wall of a compression chamber, a bearing member in the other arm, a piston reciprocable in the compression chamber, and means mounted in said bearing member for actuating said piston, said means comprising a sleeve journal positioned inside the bearing and coupled to a connecting rod for driving the piston and having on its inward wall means for engaging external splines on a driving shaft.

7. An air compressor of the character described comprising, in combination, an L-shaped casting, one arm of the L-shaped casting forming the end and side wall of a compression chamber, a bearing member in the other arm, a piston reciprocable in the compression chamber, and means mounted in said bearing member for actuating said piston, said means comprising a sleeve journal drilled throughout that portion of its length adjacent to points of contact with the bearing member and coupled to a connecting rod for driving the piston, whereby said sleeve journal may be mounted on a power take-off of an engine without additional coupling means.

8. An air compressor of the character described comprising, in combination, an L-shaped casting, a compression chamber in one arm of the L-shaped casting, a bearing member in the other arm, a piston reciprocable in the compression chamber, and means mounted in said bearing member for actuating said piston, said means comprising a sleeve journal coupled to a connecting rod attached to the piston, said sleeve journal having flanges to engage the side walls of the bearing member.

9. An air compressor of the character described comprising, in combination, an L-shaped casting, a compression chamber in one arm of the L-shaped casting, a half bearing in the other arm, a sleeve journal positioned in said half bearing and having mounted thereon eccentrically of its axis a journal coupled to a connecting rod attached to the piston, and a bearing cap for maintaining the sleeve journal in firm position in the half bearing.

10. An air compressor of the character described comprising, in combination, an L-shaped casting, one arm of the L-shaped casting forming one end and side wall of a compression chamber, a piston reciprocable in the compression chamber, a bearing member in the other arm of said casting, said other arm being offset from the other end of said chamber, leaving said other end of said chamber unobstructed to permit installation and removal of the piston, and means mounted in said bearing member for actuating said piston, said means comprising a sleeve journal positioned inside the bearing and coupled to a connecting rod for driving the piston and having on its inward wall means for engaging external splines on a driving shaft.

11. An air compressor of the character described comprising, in combination, an L-shaped casting, one arm of the L-shaped casting forming one end and side wall of a compression chamber, a piston reciprocable in the compression chamber, a half bearing in the other arm of said casting, said other arm being offset from the other end of said chamber, leaving said other end of said chamber unobstructed to permit installation and removal of the piston, and means mounted in said bearing member for actuating said piston, said means comprising a sleeve journal positioned in said half bearing and having mounted thereon eccentrically of its axis a journal coupled to a connecting rod for driving the piston, and a bearing cap containing the complementary half bearing and detachably secured to said other arm.

LEONARD B. NEIGHBOUR.